United States Patent [19]

Huber

[11] Patent Number: 4,502,663
[45] Date of Patent: Mar. 5, 1985

[54] COCK HAVING A SPHERICAL PLUG

[76] Inventor: Richard Huber, Fürstenstrasse 17 B, A-2340 Mödling, Fed. Rep. of Germany

[21] Appl. No.: 387,675

[22] Filed: Jun. 10, 1982

[30] Foreign Application Priority Data

Jun. 13, 1981 [DE] Fed. Rep. of Germany ....... 3123549

[51] Int. Cl.³ ............................................. F16K 25/00
[52] U.S. Cl. ..................................... 251/174; 251/315
[58] Field of Search ............... 251/315, 317, 174, 181, 251/185

[56] References Cited

U.S. PATENT DOCUMENTS

| 2,573,177 | 10/1951 | Bohlen | 251/315 |
| 3,394,915 | 7/1968 | Gachot | 251/315 |
| 4,217,923 | 8/1980 | Kindersley | 251/315 |
| 4,247,079 | 1/1981 | Friess | 251/317 |
| 4,326,697 | 4/1982 | Autage et al. | 251/317 |

Primary Examiner—Martin P. Schwadron
Assistant Examiner—James R. Shay

Attorney, Agent, or Firm—Abelman, Frayne, Rezac & Schwab

[57] ABSTRACT

The present invention relates to a cock having a spherical plug which is supported between two annular sealing elements intended to seal the inlet channel and outlet channel thereof, of which two sealing members at least one consists of a resilient sealing member engaging said plug of said cock in an axially prestressed condition and of a coaxially located support member which limits the axial movement of said plug due to an operating pressure, which axial movement causes a deformation of the sealing member. In order to have an excellent sealing of the cock at unlimited temperature and simultaneously small operating moments the annular sealing element is shaped as a thin-walled sheet metal body which at one end is rigidly mounted to the casing of the cock and which sheet metal body comprises two coaxially arranged ring shaped sections, of which the one is shaped and arranged as deformable sealing member and the other is shaped and arranged as rigid support member mounted to said casing.

7 Claims, 4 Drawing Figures

COCK HAVING A SPHERICAL PLUG

BACKGROUND OF THE INVENTION

1. Field of the Invention

The present invention relates to a cock having a spherical plug which is supported between two annular sealing elements intended to seal the inlet channel and outlet channel thereof, of which two sealing members at least one consists of a resilient sealing member engaging said plug of said cock in an axially prestressed condition and of a coaxially located support member which limits the axial movement of said plug due to an operating pressure, which axial movement causes a deformation of said sealing member.

2. Description of the Prior Art

Generally known are cocks having a spherical plug and comprising PTFE-sealing elements, of which at least one consists of a resilient sealing member which is actable upon by the operating pressure and abuts in an axially prestressed condition the plug of the cock and a coaxially thereto located support member which limits the axial movement of the spherical plug due to an operating pressure, which axial movement causes a deformation of the sealing member.

Such cocks are bestowed, however, temperaturewise a limited operating range and need comparatively large moments for the operation thereof.

SUMMARY OF THE INVENTION

Hence, it is a general object of the present invention to provide a metallically sealing cock having a plug which features an excellent sealing without any limitations as to temperature and which necessitates a small operating moment.

A further object of the invention is to provide a cock having a spherical plug in which the annular sealing element is a thin-walled sheet metal body which at one end is rigidly mounted to the casing of the cock, which said sheet metal body comprises two coaxially adjoining ring shaped sections formed therein, of which the one is shaped and arranged as deformable sealing member and the other is shaped and arranged as rigid support member supported by said casing.

The invention proceeds from the basic thought of using a thin-walled metallic body as sealing element, which metallic body defines—partly supported—the support element and—partly unsupported—the deformable sealing element.

Due to the structure according to the invention a design of a cock having a spherical plug including a nonsupported sphere or ball, respectively, is possible because during the larger part of the opening or closing, respectively, movement this ball is supported merely between the deformable sealing members of the sealing elements and accordingly such ball can be switched relatively easily. Not earlier than when the ball is in the closure position and a larger pressure differential acts upon this ball it supports itself against the fixed support member which leads to an increased friction resistance. This may be advantageous also at constructions having a ball which is supported, which constructions comprise a simple support which allows a certain axial movability of the ball if subject to a pressure differential. A largest elasticity or flexibility, respectively, of the sealing element is provided if the sealing element is shaped and arranged on a free edge of a thin-walled body and/or if it is supported at the casing, for instance by the agency of a cup-spring in case said thin-walled body is of an easily deformable design. Such arrangement guarantees that it is not possible to lock or clamp, respectively, during mounting of the valve the ball too strongly between the two sealing members. The sealing member must abut the plug of the cock under an axial pretension only with such force that a pressure can build up in the closure position thereof, which pressure thereafter will urge the sealing element stronger against and onto the ball. This axial pretension can be kept at a specifically small value in such case in which the sealing element abuts the ball along a line of contact. An additional sealing in the flow channel of the cock may be achieved in case also the support member is arranged and shaped to seal against the ball, whereby in order to achieve a specifically excellent seal such member abuts the ball along a line of contact.

BRIEF DESCRIPTION OF THE DRAWINGS

The present invention will be better understood and objects other than those set forth above will become apparent when consideration is given to the following detailed description thereof. Such description makes reference to the annexed drawings, wherein.

DETAILED DESCRIPTION OF THE PREFERRED EMBODIMENTS

Figure 1:
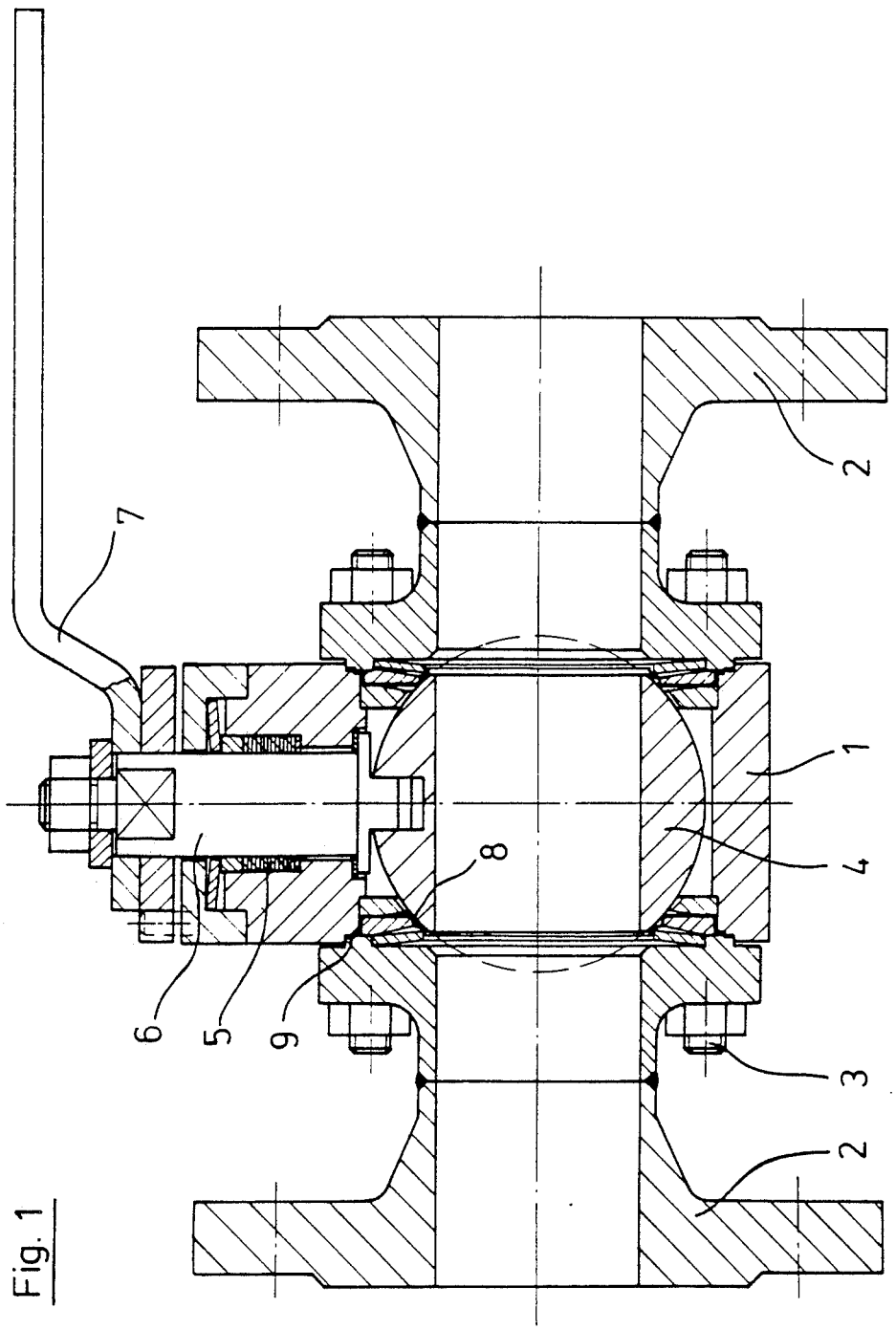
FIG. 1 is a sectional view through a first embodiment of a cock having a spherical plug.
Figure 2:
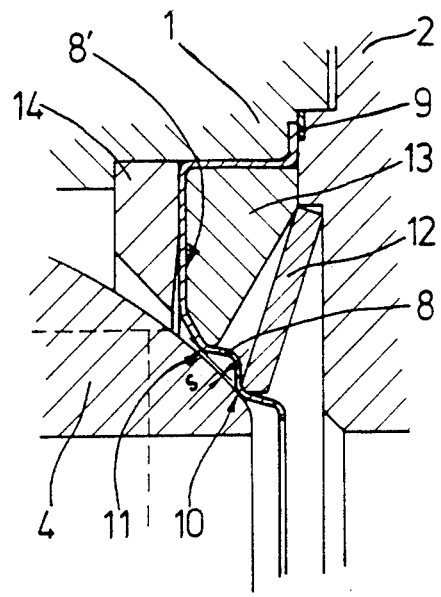
FIG. 2 shows on an enlarged scale a part of a sealing element for the cock shown in FIG. 1.

Describing now the drawings and considering initially the exemplary embodiment of the cock having a spherical plug as shown in FIG. 1, it will be understood that same comprises a casing center section 1, onto which both ends a flanged connecting piece 2 is mounted, which flanged connecting pieces 2 are held to a casing by means of bolts 3. A ball or sphere 4, respectively, is located within the casing center section 1, which ball 4 is operable by means of a hand lever 7 via a operating stud 6 extending through a stuffing box 5. The ball 4 is rotatably supported between two sealing elements 8 made of a sheet metal. The outer edge of the sealing elements 8 is clamped between the casing center section 1 and the flanged connecting piece 2 at the intermediary of a seal 9. As can be clearly seen in FIG. 2, the sealing element 8 is provided with two bulges 10, 11 facing the ball 4. As long as no pressure differential acts onto the ball 4, only the inner bulge 10 abuts the ball 4 as sealing member, whereby a cup-spring 12 acting onto the rear side of the sealing element 8 causes the sealing element to abut on the one hand under a large enough pressure along a line contact the ball 4 without that on the other hand too high forces are generated which lead to a jamming of ball 4. The outer bulge 11 acting as support member is in turn supported by a ring support at its rear side against the casing and at its front side it is located in the shown, pressureless condition at a distance from ball 4; this distance amounts normally to a few tenths less than a millimeter. If now the ball 4 of the cock through which a medium flows is rotated into its closure position, a pressure differential is built up not earlier than when a considerable restriction of the flow arises which usually is the case only shortly prior to the complete shut-off condition. As soon as the pressure differential is generated, the ball 4 will be moved in a downstream direction until it comes to abut the supported, outer bulge 11 of the sealing element 8 located downstream. The corresponding inner bulge 10 has moved together with the ball 4 at a simultaneous further pretensioning of the cup-spring 12 such that finally both bulges 10, 11, i.e. the sealing member as well as the supporting member, seal between ball 4 and casing. Because the two bulges 10, 11 of the other sealing element 8 located upstream have moved due to the acting pressure at a simultaneous deformation of the radial section 8' of the sealing element 8 together with the ball 4, bulge 10 abuts acting as sealing member of this sealing element 8 as has been the case up to this time due to the pressure acting thereupon onto ball 4 such that the through channel through the cock is sealed by means of three consecutively located sealing lines. Thereby, a supporting ring inserted into the casing center section 1 prevents a too large bulging of the radial part 8'. During a continued rotation of ball 4 in an opening direction ball 4 glides along the supporting member which takes up the pressure forces and glides until the through channel has been opened or given free, respectively, to such an extent that a pressure equalization between the inflow and outflow side of the cock has been substantially achieved. Thereafter the cup-spring 12 of the downstream sealing element 8 can move the ball 4 into its center position such that during the consecutive continued movement of ball 4 in the opening direction this ball 4 is merely supported between the inner bulges 10 acting as sealing elements. The non-supported ball 4 is in no position clamped by the sealing elements 8 because the necessary sealing forces are generated by the pressure acting upon the ball 4 or directly onto the sealing elements 8, respectively.

Figure 3:
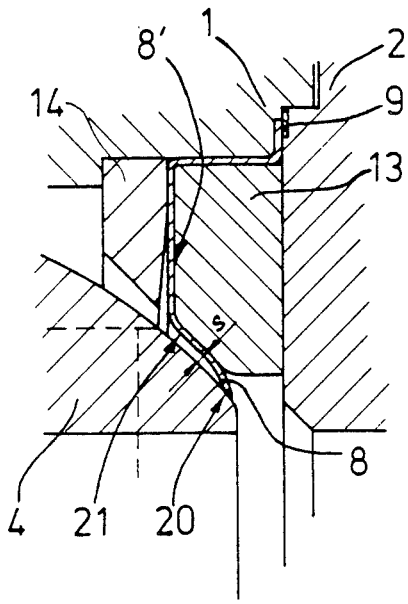
FIGS. 3 and 4 show further embodiments of the invention.

FIG. 3 shows a sealing element for a valve having a spherical plug which is provided with an outer section 21 acting as supporting member having a wide contact area relative to the ball 4 and of which the sealing member is defined directly by an edge 20 at its inner edge.

Figure 4:
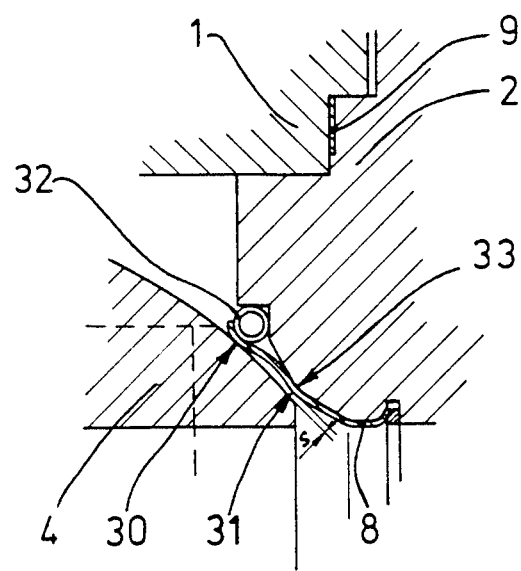

FIG. 4 shows a sealing element 8 which is rigidly connected to the flanged connecting piece 2 of the casing at its inner edge via a clamping ring and at which the inner section 31 supported by the casing is shaped to act as supporting member and the outer section 30 immediately following the inner section 31 is shaped to act as sealing member. A sprial spring 32 is located between mentioned outer section 30 and the flanged connecting piece 2, which spiral spring 32 is pretensioned by a deformation of its thickness and which spiral spring 32 urges in its rest position as shown in the drawing the outer section 30 of the thin-walled sealing element 8 against ball 4. At this embodiment only the respective downstream located sealing element 8 will come into operation because section 33 acting as sealing member at the upstream located sealing element 8 will be lifted off. Accordingly, the total operating pressure exists in the space between the two sealing elements 8, which pressure urges the outer section 33 of the downstream located sealing element 8 strongly against ball 4. As soon as a differential pressure exists when ball 4 is in its closed position or nearly its closed position, ball 4 will be urged against the supporting member 31 supported downstream by the casing whereby ball 4 closes the shown distance S. Because the support 33 at the housing has a rounded shape, this support will contact ball 4 along a line only such that also there a sealing will be formed upon an action of pressure thereupon. Accordingly, this embodiment comprises two sealing lines and also in this embodiment the moment generated by the differential pressure due to the abutting or engaging at the bearing section is present only during a small part of the rotational movement.

The shown preferred embodiments of this cock having a spherical plug disclose that it is possible to arrive also at relatively small operating moments when having an unsupported ball 4 whereby, furthermore, the sealing is achieved by the agency of successive sealing areas; surface treatments of the sealing elements 8 shaped as thin-walled bodies and/or of the ball 4 will increase the effects of the inventive design.

While there are shown and described present preferred embodiments of the invention, it is to be distinctly understood that the invention is not limited thereto, but may be otherwise variously embodied and practiced within the scope of the following claims. Accordingly,

What is claimed is:

1. In a shut-off cock of the type including:
   a housing;
   a spherical valve plug positioned for floating movement within the housing;
   means for rotating the valve plug between a closed position and a throughflow position of an opening in a said valve plug; and,
   annular seal members supported by said housing and sealingly engaging the periphery of said valve plug;
   the improvement comprising at least one said seal member being comprised of:
   a resilient thin-walled sheet metal annulus having opposite faces and which is rigidly supported by said housing at one of the inner and outer peripheries of said annulus;
   a first ring shaped section of said annulus extending towards and continuously resiliently sealingly engaging the outer periphery of said valve plug;
   a second ring shaped section of said annulus coaxial with said first ring shaped section and spaced from said valve plug when said valve plug is in its throughflow position;
   and a rigid annular back-up ring rigidly supported by said housing, said rigid annular back-up ring abutting that face of said second ring shaped section that is remote from said plug valve and having a surface configuration complementary to the juxtaposed surface of said ring shaped section, said rigid annular back-up ring providing a rigid support for said second ring shaped section and inhibiting movement of said second ring shaped section when said second ring shaped section is engaged by said plug valve when in its closed position and under pressure loading.

2. The shut-off cock of claim 1, further including a resilient means acting on said first ring shaped section and resiliently urging said first ring shaped section into sealing engagement with said valve periphery.

3. The shut-off cock of claim 2, in which said resilient member is an annular cup-shaped spring washer supported by said housing.

4. The shut-off cock of claim 2, in which said resilient member is a garter spring compressively engaging said first ring shaped section.

5. The shut-off cock of claim 1, including an annular portion of said sheet metal annulus between said second ring shaped section and the adjacent periphery of said annulus, said annular portion and said second ring shaped section abutting said back-up ring and being movable away from said back-up ring under the influence of fluid pressure to move said second ring shaped section towards the periphery of said plug valve.

6. The shut-off cock of claim 5, in which said annular portion is located between said back-up ring and an adjacent annular ring rigidly supported by said housing, the juxtaposed faces of said rings diverging from each other in a radially inward direction.

7. The shut-off cock of claim 1, in which said first ring shaped section engages said valve plug in substantially line engagement therewith.

* * * * *

UNITED STATES PATENT AND TRADEMARK OFFICE
CERTIFICATE OF CORRECTION

PATENT NO.   :   4,502,663
DATED        :   March 5, 1985
INVENTOR(S)  :   Richard HUBER It is certified that error appears in the above-identified patent and that said Letters Patent is hereby corrected as shown below:

On the title page;

Insert the following on first page, column 1, before item [21];

[73] Assignee: Klinger AG, Zug, Switzerland

Signed and Sealed this

Sixteenth Day of July 1985

[SEAL]

Attest:

DONALD J. QUIGG

Attesting Officer    Acting Commissioner of Patents and Trademarks